F. C. COSEO.
SUPPORT FOR ELECTRIC TROLLEY MECHANISM.
APPLICATION FILED MAY 28, 1909.

1,142,935.

Patented June 15, 1915.
2 SHEETS—SHEET 1.

Witnesses
B. L. Brown
S. Jay Teller

Inventor
F. C. Coseo
By H. H. Bliss
Attorney

F. C. COSEO.
SUPPORT FOR ELECTRIC TROLLEY MECHANISM.
APPLICATION FILED MAY 28, 1909.
1,142,935.
Patented June 15, 1915.
2 SHEETS—SHEET 2.
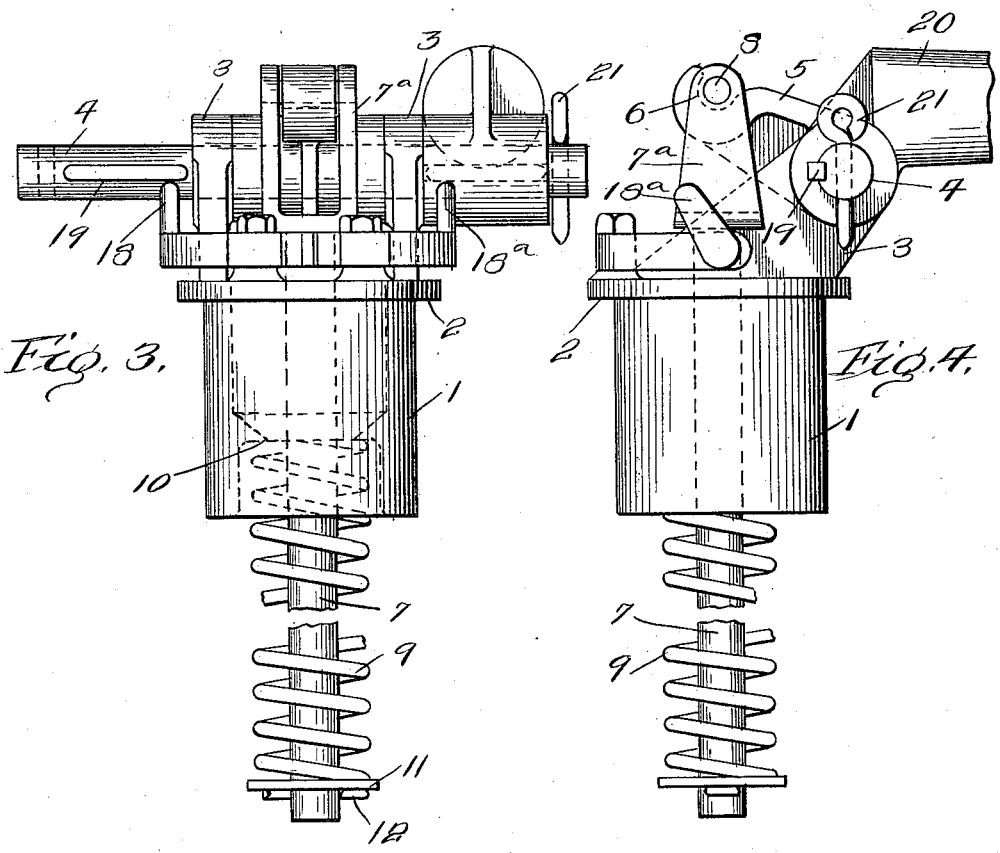
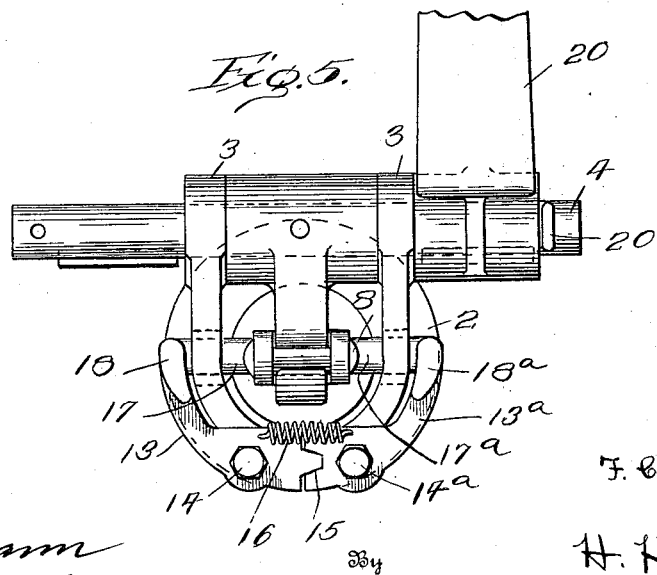
Witnesses
B. G. Mann
S. Jay Teller
Inventor
F. C. Coseo
By H. H. Bliss
Attorney

UNITED STATES PATENT OFFICE.

FREDERICK C. COSEO, OF COLUMBUS, OHIO, ASSIGNOR TO THE JEFFREY MANUFACTURING COMPANY, A CORPORATION OF OHIO.

SUPPORT FOR ELECTRIC TROLLEY MECHANISM.

1,142,935. Specification of Letters Patent. Patented June 15, 1915.

Application filed May 28, 1909. Serial No. 498,897.

*To all whom it may concern:*

Be it known that I, FREDERICK C. COSEO, a citizen of the United States, residing at Columbus, in the county of Franklin and State of Ohio, have invented certain new and useful Improvements in Supports for Electric Trolley Mechanism, of which the following is a specification, reference being had therein to the accompanying drawings.

This invention relates to improvements in supports for electric trolley mechanisms, and is especially adapted for use on mine locomotives.

The object of the invention is to produce a trolley support from which the pole may be easily and quickly removed for the purpose of reversing it in places where it is not possible to reverse it in the ordinary manner.

Figure 1:
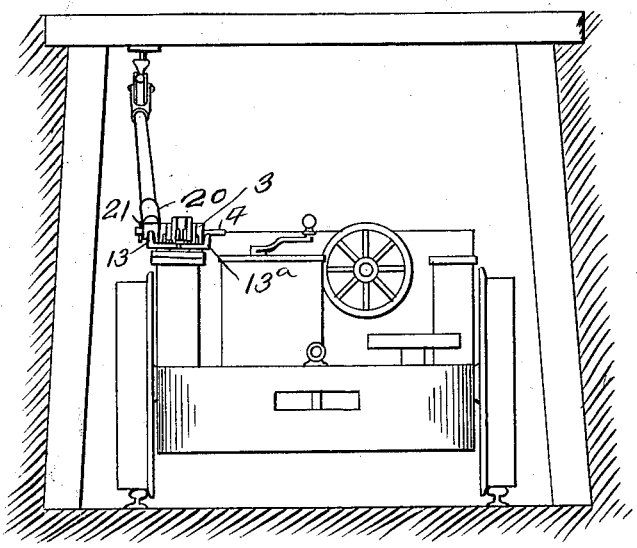
Figure 2:
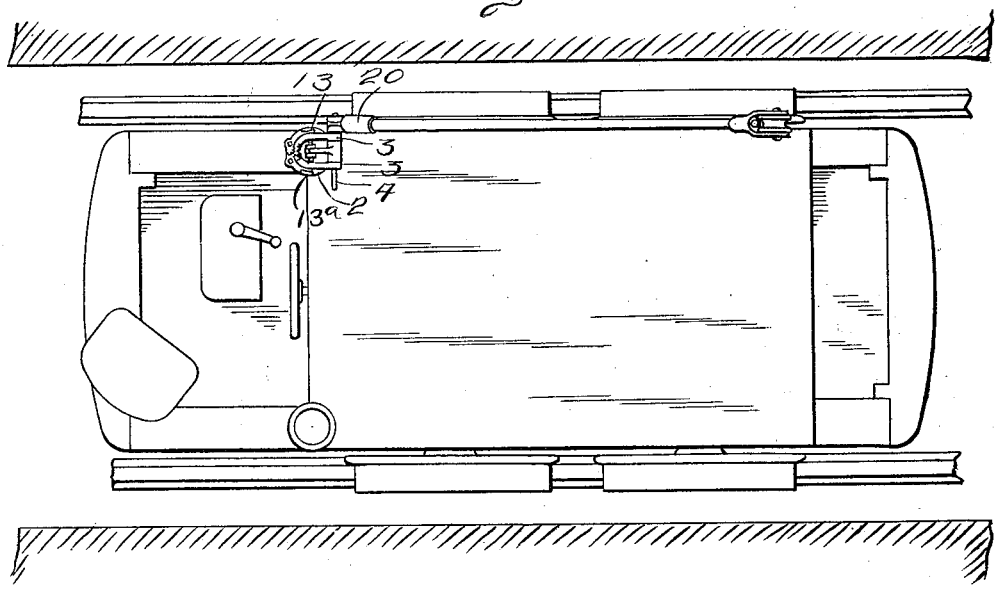

Figure 1 is an end view of a locomotive having a trolley support embodying my invention in a mine entry which is shown in cross section. Fig. 2 is a plan view of the locomotive shown in Fig. 1. Fig. 3 is an end view of the trolley support removed from the locomotive. Fig. 4 is a side view. Fig. 5 is a plan view.

The lower part of the supporting mechanism, including the base, the spring mechanism, the catch, etc., may be of any usual or suitable construction. The form which I prefer, however, and which I have shown in the drawings is one which is shown and described in my application entitled "Support for electric trolley mechanism," filed February 13, 1904, Serial Number 193,452, renewed Dec. 8, 1909, Serial No. 532,034.

Referring to Figs. 3, 4 and 5 of the drawings, 1 represents the trolley base which is adapted to fit into and rotate in a suitable socket of the locomotive frame. This base 1 is provided with a flange plate or ring 2 which is adapted to rest on the upper surface of the locomotive frame. The base 1 is provided with two rearward extending bosses or bearing brackets 3, in which the pin 4 is rotatably mounted. The hook or arm 5 is pinned or keyed to the pin 4 and extends forward so that the hooked portion 6 will lie practically above the center of the base 1. The rod 7 extends through the central aperture of the base and has a forked upper end 7$^a$. The pin 8 is mounted in the forked portion and engages the hook 6 of the arm 5. The compression spring 9 surrounds the rod 7 and at its upper end rests against the flange 10 of the base 1. The lower end of the spring engages the washer 11 which is held in place on the rod by the cotter pin 12.

13 and 13$^a$ are catches or pawls pivotally mounted on the base 1 by means of the bolts 14 and 14$^a$. The pawl 13 is provided with a tooth 15 which engages a corresponding notch in the pawl 13$^a$ so that a movement of one pawl will cause a corresponding movement of the other.

16 is a spring connecting the two pawls and tending to draw them together.

17 and 17$^a$ are inwardly projecting fingers which normally rest against the outer faces of the fork 7$^a$. Whenever the arm 5 is lifted, the spring 16 throws the pawls together and the fingers 17 and 17$^a$ engage the end of the fork 7$^a$ and hold it in its uppermost position as shown in the figures.

18 and 18$^a$ are handles by means of which the pawls may be separated to release the fork 7$^a$.

The pin 4 is extended on each side of the bearings 3 and at its ends is provided with keys 19. The pin 4 serves as a trolley arm carrying device. The lower end of the trolley arm 20 is adapted to fit over the pin 4 at either end and be engaged by one of the keys 19. The cotter pin 21 serves to hold the arm 20 in place on either end of the pin.

When it is desired to reverse the trolley, and the locomotive is in a narrow entry, as shown in Figs. 1 and 2, the arm 20 is first dropped to its horizontal position where it is automatically locked by the pawls 13 and 13$^a$, as shown in Fig. 4. The arm is then removed from the supporting mechanism by taking out the cotter pin 21, and removing the arm from the pin 4. The supporting mechanism may then be reversed and, if necessary, the arm may be carried to a point beyond the locomotive, where it can be easily turned around. It is then replaced on the pin 4, preferably at the other end from that from which it was removed, the cotter 21 being inserted to hold it in place. The pawls 13 and 13$^a$ may then be released and the trolley placed in position on the wire.

It will be noted that the trolley arm swings in a plane parallel to but outside of the pivotal axis of the base. This enables it to be supported at a point farther removed from the center of the locomotive, and the trolley wire may be placed at a correspondingly greater distance to the side, thus decreasing the danger of accidental contact by the operator. In order to maintain the pole in the same plane after reversing, it is necessary to replace it on the other end of the pin 4 as described above.

What I claim is:—

1. In a trolley support, a base adapted to be rotatably mounted on a locomotive, a pin rotatably mounted on the base, and extending laterally beyond its point of support, a trolley arm, means for securing the arm to the laterally extending portion of the pin, the said securing means being arranged to permit removal of the arm from the pin without removal of the pin from the base, means for moving the pin to hold the arm in operative position, and means for locking the pin so that the arm will be in its inoperative position, substantially as set forth.

2. In a trolley support, a base having two bearing bosses, a horizontal pin mounted in the bosses and extending laterally on each side of the bosses, keys on the laterally extending portions of the pin, an arm secured to the pin between the bosses, a trolley pole adapted to fit over one end of the pin and be engaged by one of the keys, means for holding the pole in position on the pin, and means for depressing the arm to throw the pole into operative position, substantially as set forth.

3. In a trolley support, the combination of a pivotally mounted carrying device, a trolley arm, means whereby the trolley arm may be detachably secured to the carrying device in any one of a plurality of positions arranged transversely with respect to the arm, and means tending to move the carrying device to hold the arm in operative position, substantially as set forth.

4. In a trolley support, the combination of a base, a horizontal pin rotatably mounted on the base and extending laterally on each side of its point of support, a trolley pole adapted to be rigidly secured to either laterally extending end of the pin, and means for rotating the pin to throw the pole into operative position, substantially as set forth.

5. In a trolley support, the combination of a base, a horizontal pin rotatably mounted on the base and extending laterally at each side of its point of support, a trolley pole adapted to be rigidly secured to the pin on either of its laterally extending ends, means for moving the pin to throw the pole into operative position, and means for locking the pin in position with the pole depressed, substantially as set forth.

6. In a trolley support, the combination of a carrying device supported against horizontal bodily movement, a trolley arm, means for rigidly securing the trolley arm to the carrying device in any one of a plurality of positions arranged transversely with respect to the arm, and means tending to move the carrying device to hold the arm in operative position, substantially as set forth.

In testimony whereof I affix my signature, in presence of two witnesses.

FREDERICK C. COSEO.

Witnesses:
J. G. BROWN,
E. P. SNIVELY.

Copies of this patent may be obtained for five cents each, by addressing the "Commissioner of Patents, Washington, D. C."